United States Patent

Fraenkle et al.

[11] Patent Number: 4,770,150
[45] Date of Patent: Sep. 13, 1988

[54] LOW PRESSURE FUEL CIRCULATION WITH FUEL PREHEATING FOR AN AIR-COMPRESSING INJECTION INTERNAL COMBUSTION ENGINE, ESPECIALLY FOR COMMERCIAL VEHICLES

[75] Inventors: Gerhard Fraenkle, Remshalden; Peter Joppig, Korb, both of Fed. Rep. of Germany

[73] Assignee: Daimler-Benz Aktiengesellschaft, Stuttgart, Fed. Rep. of Germany

[21] Appl. No.: 94,906

[22] Filed: Sep. 10, 1987

[30] Foreign Application Priority Data

Sep. 17, 1986 [DE] Fed. Rep. of Germany ....... 3631579

[51] Int. Cl.4 .............................................. F02M 39/00
[52] U.S. Cl. .................................... 123/510; 123/557; 123/198 D
[58] Field of Search ............... 123/510, 511, 512, 557, 123/514, 198 D

[56] References Cited

U.S. PATENT DOCUMENTS

| | | |
|---|---|---|
| 3,548,796 | 12/1970 | Gastiniue ............................ 123/510 |
| 4,187,813 | 2/1980 | Stumpp ............................... 123/510 |
| 4,377,149 | 3/1983 | Naylor ................................ 123/510 |
| 4,454,851 | 6/1984 | Bourbonnaud ..................... 123/514 |
| 4,478,197 | 10/1984 | Yasuhara ............................ 123/514 |
| 4,574,762 | 3/1986 | Müller ................................ 123/510 |
| 4,600,825 | 7/1986 | Blazejousky ....................... 123/557 |
| 4,625,701 | 12/1986 | Bartlett .............................. 123/557 |

FOREIGN PATENT DOCUMENTS

| | | | |
|---|---|---|---|
| 2430636 | 2/1975 | Fed. Rep. of Germany ...... 123/514 |
| 3034730 | 4/1981 | Fed. Rep. of Germany ...... 123/510 |
| 3442980 | 5/1986 | Fed. Rep. of Germany ...... 123/514 |
| 2028921 | 3/1980 | United Kingdom ............... 123/510 |
| 0723203 | 3/1980 | U.S.S.R. ............................ 123/510 |
| 0950939 | 8/1982 | U.S.S.R. ............................ 123/514 |

*Primary Examiner*—Carl Stuart Miller
*Attorney, Agent, or Firm*—Barnes & Thornburg

[57] ABSTRACT

A low pressure fuel circulation with fuel preheating for an air-compressing injection-type internal combustion engine, preferably for commercial vehicles, in which a heat-exchanger and a by-pass by-passing the fine filter and having an excess pressure valve opening in dependence on a predetermined maximum pressure acting on the fine filter as a result of paraffin formation is arranged in an inlet line leading to a high pressure injection pump.

9 Claims, 2 Drawing Sheets

LOW PRESSURE FUEL CIRCULATION WITH FUEL PREHEATING FOR AN AIR-COMPRESSING INJECTION INTERNAL COMBUSTION ENGINE, ESPECIALLY FOR COMMERCIAL VEHICLES

BACKGROUND AND SUMMARY OF THE INVENTION

The present invention relates to a low pressure fuel circulation with fuel pre-heating for an air-compressing injection internal combustion engine, especially for commercial vehicles.

It is known that in the low pressure fuel circulation for internal combustion engines with diesel operation the fuel is sucked-in by a pump initially by way of relatively coarse-meshed filters and is conducted by way of a fine filter to the injection pump and cleansed. However, diesel fuels have the property at low temperatures (those under the so-called BPA-point) to separate out or precipitate paraffin crystals which clog up the filter and lead to operating troubles of the vehicle.

The not-yet-published German Patent Application No. P 35 38 360.7-13 proposes as effective remedial measure, that the fuel is preheated by a heat-exchanger operatively connected with the cooling water circulation and is fed back in a low viscous condition.

Such a fuel pre-heating is satisfactory for passenger motor vehicles; however, pure water-fuel heating systems are not suitable for commercial vehicles to avoid the clogging-up of the fine filter prior to reaching a sufficiently high heating water temperature by reason of the low waste heat of directly injecting engines and in view of the as a rule large water content of large-volume commercial-type vehicle engines.

Furthermore, the use of electric pre-heating systems is known from the DE-OS No. 30 34 730 which, however, entail the disadvantage that the battery capacity of the vehicle is subjected to additional loads to a not insignificant degree and a relatively high expenditure is required also by the cabling requirement.

The present invention is therefore concerned with the task to undertake simple measures to assist in avoiding the operating troubles of the internal combustion engine which, however, counteract in particular the short intermediate condition between the response of the water-heating system, respectively, of the heat-exchanger cooperating with the cooling circulation and the clogging of the fine filter.

The underlying problems are solved according to the present invention in that the inlet line is provided with a by-pass by-passing the fine filter which includes an excess pressure valve opening in dependence on a predetermined maximum pressure acting on the fine filter as a result of paraffin formation. Owing to the arrangement of an excess pressure valve in a by-pass by-passing the fine filter, the fuel initially flows into the filter housing before it can reach the injection pump when reaching the opening pressure as a result of paraffin accumulation. The warming-up fuel dissolves the paraffin accumulation little-by-little and reduces the difference pressure at the filter which finally leads to the closing of the excess pressure valve.

As the excess pressure valve not only responds to paraffin accumulation at the filter input but also to contaminations, which cause the opening of the excess pressure valve whereas this cannot be recognized as such by the driver, the volume stream reaching the injection pump can be limited according to a further feature of the present invention by the arrangement of a throttle in the by-pass downstream of the excess pressure valve, whereby the clogging of the filter will be noticed by the driver by the decrease of the engine output.

A further advantageous feature of the present invention resides in providing in the by-pass a pressure monitoring device with a signal transmitter, by means of which the clogged-up filter is indicated to the driver.

According to still further features of the present invention pursuant to which the excess pressure valve is thermostatically controlled, one obtains the advantage that the excess pressure valve only opens when the fuel pressure increases correspondingly ahead of the filter by paraffin formation but locks automatically when the warm operating temperature adjusted by the thermostat is reached by the heat-exchanger. The phase of the passage of unfiltered fuel by way of the by-pass can be controlled more precisely thereby. The construction of apertured disks serves to circumcirculate the thermostat well with fuel when the excess pressure valve is opened and thus to improve the response behavior.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein.

DETAILED DESCRIPTION OF THE DRAWINGS

Figure 1:
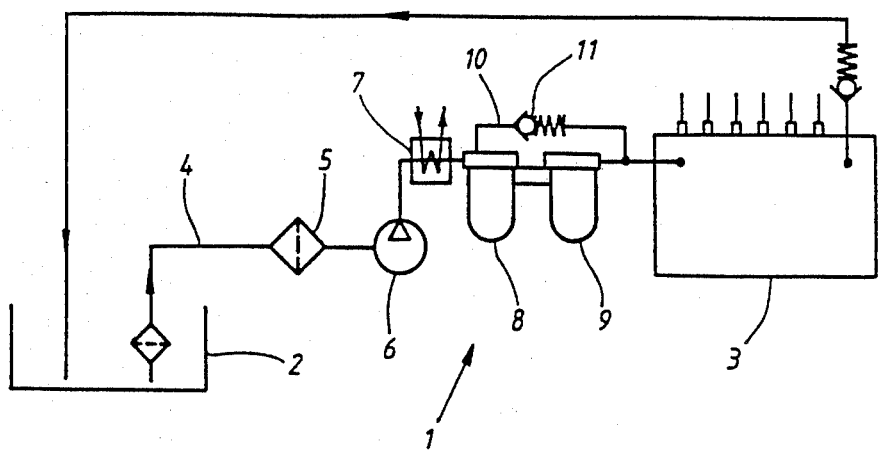
FIG. 1 is a schematic view of a low pressure fuel circulation with a by-pass by-passing the fine filter and including an excess pressure valve in accordance with the present invention.

Referring now to the drawing wherein like reference numerals are used throughout the various views to designate like parts, the low pressure fuel circulation generally designated by reference numeral 1 for an air-compressing injection internal combustion engine consists of a fuel tank 2, of an inlet line 4, with a pre-filter 5, leading to a high-pressure injection pump 3, of a feed pump 6, of a heat-exchanger 7 effective at low fuel temperatures and acted upon by the cooling water of the internal combustion engine as well as of two main, respectively, fine filters 8 and 9. Additionally, a by-pass 10 by-passing the fine filters 8 and 9 is provided which includes an excess pressure valve 11 that opens at low fuel temperatures below a so-called BPA-point and thickening of the fuel as a result of paraffin formation at the input of the fine filter 8 and permits the passage of the unfiltered fuel by way of the by-pass 10 to the injection pump 3 for a short period of time.

Figure 2:
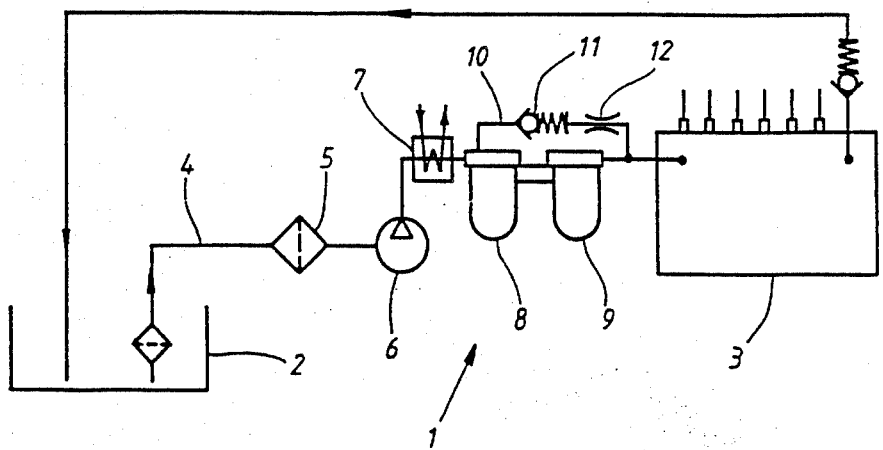
FIG. 2 is a schematic view similar to FIG. 1, in which the by-pass is additionally provided with a throttle according to the present invention.

In FIG. 2, in addition to the excess pressure valve 11, a throttle 12 is arranged in the by-pass 10 downstream of the valve 11 which with a soiled filter 8 limits the volume flow of the fuel re-routed by way of the by-pass also when the internal combustion engine is warmed up to its operating temperature, in order to direct the driver's attention in this manner to the operating trouble of the internal combustion engine.

Figure 3:
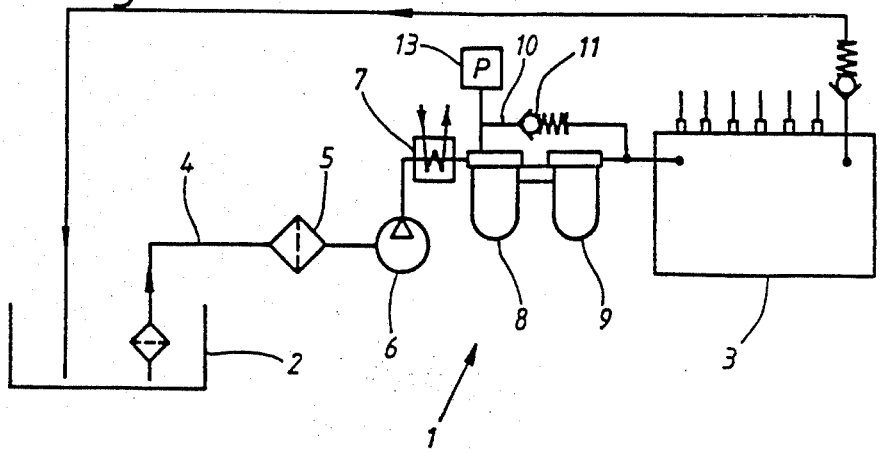
FIG. 3 is a schematic view, similar to FIG. 1, in which the by-pass is provided with a pressure-monitoring device in accordance with the present invention.

For the same purpose—according to FIG. 3—as an alternative a pressure-monitoring device with a pressure signal transmitter 13 may be installed in the by-pass 10 upstream of the pressure valve 11, which indicates to the driver, for example, at the instrument panel, the re-routing of the fuel.

Figure 4:
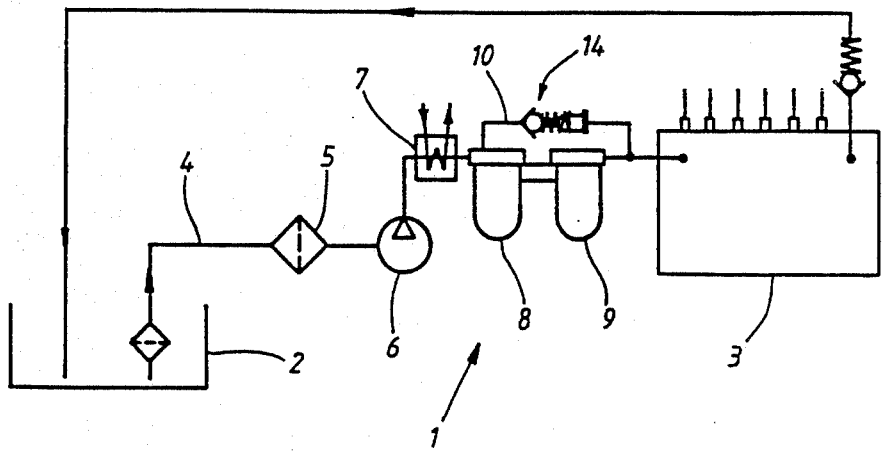
FIG. 4 is a schematic view of a low pressure fuel circulation similar to FIG. 1 in which the by-pass includes a thermostat controlled as a function of temperature in accordance with the present invention.
Figure 5:
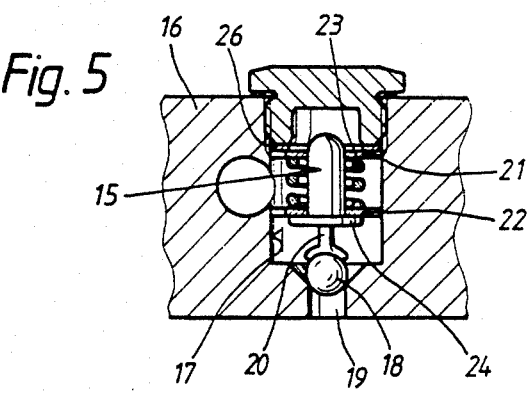
FIG. 5 is a partial cross-sectional view, on an enlarged scale, through the excess pressure valve with thermostat in accordance with the present invention.

In FIG. 4, the excess pressure valve 11 is a part of a structural unit generally designated by reference numeral 14 which includes a thermostat 15 for the temperature-dependent locking of the by-pass. According to FIG. 5 the structural unit 14 can be integrated into the filter upper part 16 of the fine filter 8, and more particularly in a cylindrical recess 17 of the filter upper part 16. The excess pressure valve 11 consists of a spring-loaded valve hall 18 as closure member which closes the by-pass inlet 19. An expansion element 20 of the thermostat 15 which rests on the ball 18, is supported in two apertured disks 21 and 22. The apertured disk 22 which is longitudinally displaceably guided in the recess 17 against a return spring 23 of the excess pressure valve 11, abuts at a collar 24 of the thermostat 15 whereas the apertured disk 21 is pressed by the force of the spring 23 against a fastening screw 25 closing the recess 17. The washer 26 serves for the pressure adjustment of the excess pressure valve 11.

Figure 5A:
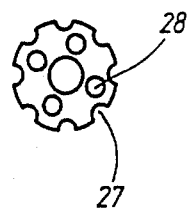
FIG. 5a is a plan view on an apertured disk of the thermostat of FIG. 5.

The thermostat 15 is guided with bearing play in the apertured disk 21. The apertured disks 21 and 22—as can be seen from FIG. 5a—are provided with openings 27 and 28 in order that the fuel conducted by way of the by-pass 10 can intensively circumcirculate the thermostat 15 for a completely satisfactory temperature-sensing in the recess 17.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A low pressure fuel circulation with fuel pre-heating means for an air-compressing injection-type internal combustion engine, comprising inlet line means leading from a fuel tank by way of a feed pump to a high pressure injection pump, said inlet line means including pre-filter means, at least one fine filter means and heat-exchanger means operable at low fuel temperatures, the inlet line means further including a by-pass means by-passing the fine filter means, and the by-pass means including an excess pressure valve means opening at a predetermined maximum pressure as a result of paraffin formation acting on the fine filter means.

2. A low pressure fuel circulation according to claim 1, wherein the injection-type internal combustion engine is for commercial type vehicles.

3. A low pressure fuel circulation according to claim 2, wherein said heat-exchanger means is acted upon by cooling water of the internal combustion engine.

4. A low pressure fuel circulation according to claim 1, wherein the by-pass means includes a throttle means arranged downstream of the excess pressure valve means.

5. A low pressure fuel circulation according to claim 1, further comprising pressure-monitoring means with a pressure signal transmitter provided in the by-pass means.

6. A low pressure fuel circulation according to claim 1, further comprising, in addition to the excess pressure valve means, a thermostat means in the by-pass means, said thermostat means operating in dependence on the fuel temperature and being operable to cause locking of the by-pass means.

7. A low pressure fuel circulation according to claim 6, wherein the excess pressure valve means and the thermostat means form a structural unit, the thermostat means including an expansion element and the excess pressure valve means including a closure member, the expansion element cooperating with the closure member which opens against the force of a return spring.

8. A low pressure fuel circulation according to claim 7, wherein the structural unit is arranged in a recess of an upper part of the fine filter means and the thermostat means as part of the structural unit is surrounded by two apertured disks supported at a distance from one another and assuring the fuel circumcirculation of the thermostat means, one of said apertured disks being longitudinally displaceably guided together with the thermostat means in the recess against the return spring while the other apertured disk is locally fixedly held and the thermostat means is displaceably supported in the other apertured disk.

9. A low pressure fuel circulation according to claim 8, wherein the return spring as part of the excess pressure valve means supportingly abuts at both apertured disks and the expansion element rests on the closure member constructed as ball under the return spring force.

* * * * *